United States Patent
Beaman et al.

(10) Patent No.: US 8,145,598 B2
(45) Date of Patent: Mar. 27, 2012

(54) METHODS AND SYSTEMS FOR SINGLE INSTANCE STORAGE OF ASSET PARTS

(75) Inventors: Peter D. Beaman, Newton, MA (US);
Tuyen M. Tran, Westwood, MA (US);
Robert S. Newson, Windsor (GB)

(73) Assignee: Iron Mountain Incorporated, Boston, MA (US)

( * ) Notice: Subject to any disclaimer, the term of this patent is extended or adjusted under 35 U.S.C. 154(b) by 275 days.

(21) Appl. No.: 12/391,099

(22) Filed: Feb. 23, 2009

(65) Prior Publication Data

US 2010/0228784 A1 Sep. 9, 2010

(51) Int. Cl.
*G06F 17/00* (2006.01)

(52) U.S. Cl. ........ 707/610; 707/615; 707/633; 707/634; 707/635; 707/640; 707/648; 707/812

(58) Field of Classification Search ............ 707/610, 707/615, 633, 634, 635, 640, 648, 812
See application file for complete search history.

(56) References Cited

U.S. PATENT DOCUMENTS

| | | |
|---|---|---|
| 5,287,499 A | 2/1994 | Nemes |
| 5,440,727 A | 8/1995 | Bhide et al. |
| 5,812,398 A * | 9/1998 | Nielsen .......... 705/1.1 |
| 5,813,008 A | 9/1998 | Benson et al. |
| 6,041,423 A | 3/2000 | Tsukerman |
| 6,477,544 B1 | 11/2002 | Bolosky et al. |
| 6,629,198 B2 | 9/2003 | Howard et al. |
| 6,678,809 B1 | 1/2004 | Delaney et al. |
| 6,865,577 B1 | 3/2005 | Sereda |
| 7,003,551 B2 * | 2/2006 | Malik .......... 709/206 |
| 7,093,137 B1 | 8/2006 | Sato et al. |
| 7,165,082 B1 * | 1/2007 | DeVos .......... 1/1 |
| 7,197,599 B2 | 3/2007 | Corrado |
| 7,254,596 B2 | 8/2007 | De Spiegeleer |
| 7,379,549 B2 | 5/2008 | Pelly et al. |
| 7,424,637 B1 | 9/2008 | Schoenthal et al. |
| 7,433,898 B1 * | 10/2008 | Georgiev .......... 1/1 |
| 7,457,800 B2 * | 11/2008 | Margolus et al. .......... 1/1 |
| 7,457,813 B2 * | 11/2008 | Margolus et al. .......... 1/1 |

(Continued)

FOREIGN PATENT DOCUMENTS

EP 1 818 847 A2 8/2007

OTHER PUBLICATIONS

Decandia, Giuseppe et al., Dynamo: Amazon's Highly Available Key-value Store, Amazon.com, SOSP'07, Oct. 14-17, 2007, Stevenson, Washington, pp. 205-220.

(Continued)

*Primary Examiner* — Thanh-Ha Dang (57) ABSTRACT

Methods and systems are disclosed that relate to single instance storage of asset parts utilizing a back reference count associated with each asset part. Entries in a journal associated with the asset parts reflect the intention to increment or decrement an asset part's back reference count. The journal may be used to maintain an accurate and reliable reference count for asset parts replicated across multiple disk drives in a distributed storage system, where the replication is structured to reduce the risk of data loss in the event of a disk drive failure. The journal entries may comprise generation numbers used to maintain a back reference count associated with an asset part and to verify a back reference count associated with an asset part.

18 Claims, 7 Drawing Sheets

U.S. PATENT DOCUMENTS

| | | | |
|---|---|---|---|
| 7,469,260 B2* | 12/2008 | Enko et al. .............................. | 1/1 |
| 7,653,836 B1* | 1/2010 | Chatterjee et al. .............. | 714/20 |
| 7,672,981 B1* | 3/2010 | Faibish et al. .......... | 707/999.204 |
| 7,716,060 B2 | 5/2010 | Germeraad et al. | |
| 7,818,517 B1* | 10/2010 | Glade et al. ................... | 711/154 |
| 7,827,150 B1* | 11/2010 | Wu et al. ....................... | 707/674 |
| 7,849,059 B2* | 12/2010 | Prahlad et al. ................ | 707/648 |
| 2003/0028783 A1 | 2/2003 | Collins et al. | |
| 2003/0120864 A1* | 6/2003 | Lee et al. ...................... | 711/114 |
| 2003/0145167 A1* | 7/2003 | Tomita .......................... | 711/114 |
| 2003/0188153 A1 | 10/2003 | Demoff et al. | |
| 2004/0024739 A1 | 2/2004 | Copperman et al. | |
| 2004/0049700 A1 | 3/2004 | Yoshida | |
| 2004/0111557 A1* | 6/2004 | Nakatani et al. .............. | 711/113 |
| 2005/0015416 A1 | 1/2005 | Yamagami | |
| 2005/0033777 A1* | 2/2005 | Moraes et al. ................ | 707/202 |
| 2005/0114399 A1 | 5/2005 | Hosoi | |
| 2005/0262361 A1 | 11/2005 | Thibadeau | |
| 2006/0031230 A1* | 2/2006 | Kumar ............................ | 707/10 |
| 2006/0106811 A1 | 5/2006 | Blumenau et al. | |
| 2006/0106884 A1 | 5/2006 | Blumenau et al. | |
| 2006/0106898 A1 | 5/2006 | Frondozo et al. | |
| 2006/0112112 A1* | 5/2006 | Margolus et al. ............. | 707/100 |
| 2006/0136735 A1 | 6/2006 | Plotkin et al. | |
| 2006/0143168 A1 | 6/2006 | Rossmann | |
| 2006/0206662 A1 | 9/2006 | Ludwig et al. | |
| 2006/0224846 A1* | 10/2006 | Amarendran et al. ........ | 711/162 |
| 2006/0230244 A1* | 10/2006 | Amarendran et al. ........ | 711/162 |
| 2006/0235908 A1 | 10/2006 | Armangau et al. | |
| 2006/0236029 A1* | 10/2006 | Corrado et al. ............... | 711/114 |
| 2006/0248055 A1 | 11/2006 | Haslam et al. | |
| 2006/0248273 A1 | 11/2006 | Jernigan, IV et al. | |
| 2006/0265370 A1 | 11/2006 | Qian | |
| 2006/0271547 A1* | 11/2006 | Chen et al. ...................... | 707/10 |
| 2006/0288161 A1* | 12/2006 | Cavallo ......................... | 711/114 |
| 2007/0110044 A1 | 5/2007 | Barnes et al. | |
| 2007/0112883 A1 | 5/2007 | Asano et al. | |
| 2007/0180000 A1* | 8/2007 | Mine et al. .................... | 707/204 |
| 2008/0005194 A1 | 1/2008 | Smolen et al. | |
| 2008/0243878 A1* | 10/2008 | de Spiegeleer et al. ....... | 707/100 |
| 2008/0243953 A1* | 10/2008 | Wu et al. ....................... | 707/204 |
| 2008/0263363 A1 | 10/2008 | Jueneman et al. | |
| 2009/0259669 A1 | 10/2009 | Abbruzzi et al. | |
| 2010/0082672 A1* | 4/2010 | Kottomtharayil et al. .... | 707/770 |
| 2010/0088280 A1* | 4/2010 | Satoyama et al. ............. | 707/640 |
| 2010/0153338 A1* | 6/2010 | Ngo et al. ...................... | 707/610 |
| 2010/0215175 A1 | 8/2010 | Newson et al. | |
| 2010/0217931 A1 | 8/2010 | Beaman et al. | |
| 2010/0217953 A1 | 8/2010 | Beaman et al. | |

OTHER PUBLICATIONS

Guy, Richard G., Ficus: A Very Large Scale Reliable Distributed File System, Technical Report CSD-910018, Computer Science Department, University of California, Los Angeles, CA, Jun. 3, 1991.

Honicky, R.J. et al., Replication Under Scalable Hashing: A Family of Algorithms for Scalable Decentralized Data Distribution, Proceedings of the 18th International Parallel and Distributed Processing Symposium, Santa Fe, NM, Apr. 2004.

Microsoft IT Showcase, Single Instance Storage in Microsoft Windows Storage Server 2003 R2: A Solution for Managing Duplicate Files, Technical White Paper, May 2006.

Mohan, C. et al., ARIES: A Transaction Recovery Method Supporting Fine-Granularity Locking and Partial Rollbacks Using Write-Ahead Logging, Association for Computing Machinery, ACM Transactions on Database Systems, vol. 17, No. 1, Mar. 1992, pp. 94-162.

Satyanarayanan, M., Coda: A Highly Available File System for a Distributed Workstation Environment, IEEE Transactions on Computers, vol. 39, p. 447-459 (1990), available at http://citeseerx.ist.psu.edu/viewdoc/summary?doi=10.1.1.31.1314.

Weil, Sage A. et al., Ceph: A Scalable, High-Performance Distributed File System, OSDI '06: 7th USENIX Symposium on Operating Systems Design and Implementation, pp. 307-320.

Weil, Sage A. et al., CRUSH: Controlled, Scalable, Decentralized Placement of Replicated Data, IEEE, SC2006, Nov. 2006, Tampa, Florida.

Wikipedia, List of file systems, Nov. 27, 2007, http//en.wikipedia.org/wiki/List_of_file_systems.

Wikipedia, Replication (Computer Science), Nov. 27, 2007, http://en.wikipedia.org/wiki/Replication_%28computer_science%29.

Xin, Qin et al., Evaluation of Distributed Recovery in Large-Scale Storage Systems, Proceedings of the 13th IEEE International Symposium on High Performance Distributed Computing, Honolulu, HI, Jun. 2004.

International Search Report and Written Opinion issued in International Patent Application No. PCT/US2010/024889; Date of Mailing: Oct. 22, 2010.

International Search Report and Written Opinion issued in International Patent Application No. PCT/US2010/024891; Date of Mailing: Sep. 22, 2010.

Kumar, S. et al. "Segmented Hash: An Efficient Hash Table Implementation for High Performance Networking Subsystems" Proceedings of the Symposium on Architecture for Networking and Communications Systems (ANCS), Oct. 26-28, 2005, Princeton, New Jersey; pp. 91-103.

Seagate "The Benefits of Self-Encrypting Drives in the Data Center" Technology Paper, Publication No. TP590.1-0804US, Apr. 1, 2008 [online]. Retrieved from the Internet: http://www.lsi.com/campaigns/forms/security_cw/downloads/pdf/TP590.1-0804US_lr.pdf.

Wikipedia "Key derivation function" Dec. 25, 2008 [online]. Retrieved from the Internet: http://en.wikipedia.org/w/index.php?title=Key_derivation_function&oldid=260028157.

Jenkins, Bob, "Hash Functions", Dr. Dobb's Journal, Sep. 1, 1997, available at http//www.ddj.com/architect/184410284 (5 pages).

Jenkins, Robert J., "Hash Functions for Hash Table Lookup", 1995-1997, http//www.burtleburtle.net/bob/hash/evahash.html (8 pages).

Broder, A. et al. "Using Multiple Hash Functions to Improve IP Lookups" IEEE INFOCOM 2001: 20th Annual Joint Conference of the IEEE Computer and Communications Society, Anchorage, Alaska, Apr. 22-26, 2001; Proceedings, vol. 3, pp. 1454-1463.

International Business Machines Corp. (IBM) "Cache Hash Overflow Table for Computers Using Cache Memory" Technical Disclosure Bulletin, vol. 32, No. 3B, pp. 110-117 (Aug. 1, 1989).

International Search Report and Written Opinion issued in International Patent Application No. PCT/US2010/024784; Date of Mailing: Jul. 13, 2010.

International Search Report and Written Opinion issued in International Patent Application No. PCT/US2010/024787; Date of Mailing: May 18, 2010.

Kirsch, A. et al. "On the Performance of Multiple Choice Hash Tables with Moves on Deletes and Inserts" *2008 46th Annual Allerton Conference on Communication, Control, and Computing*. Allerton House, UIUC, Illinois, USA, Sep. 23-26, 2008 IEEE; ThD1.4, pp. 1284-1290.

Partial International Search Report, Annex to Invitation to Pay Fees, issued in International Patent Application No. PCT/US2010/024891; Date of Mailing: Jun. 24, 2010.

Final Office Action dated Dec. 23, 2010, issued in U.S. Appl. No. 12/100,962, by Abbruzzi et al., filed Apr. 10, 2008.

Advisory Action dated Mar. 2, 2011, issued in U.S. Appl. No. 12/100,962, by Abbruzzi et al., filed Apr. 10, 2008.

* cited by examiner

Journal 502

| | | | |
|---|---|---|---|
| Entry 561 | <Generation 601>, | "AR": | <Asset Identifier 438> <Unique Identifier 410> |
| Entry 562 | <Generation 602>, | "AR": | <Asset Identifier 438> <Unique Identifier 416> |
| Entry 563 | <Generation 603>, | "CR": | <NULL> <Generation 601> |
| Entry 564 | <Generation 604>, | "AR": | <Asset Identifier 439> <Unique Identifier 416> |
| Entry 565 | <Generation 605>, | "AR": | <Asset Identifier 439> <Unique Identifier 426> |
| Entry 566 | <Generation 606>, | "AR": | <Asset Identifier 439> <Unique Identifier 432> |
| Entry 567 | <Generation 607>, | "RR": | <Asset Identifier 438> <Unique Identifier 410> |
| Entry 568 | <Generation 608>, | "RR": | <Asset Identifier 438> <Unique Identifier 416> |
| Entry 569 | <Generation 609>, | "CR": | <Generation 603> <Generation 605> |
| . . . | | | |

Confirmation Boundary 600

METHODS AND SYSTEMS FOR SINGLE INSTANCE STORAGE OF ASSET PARTS

BACKGROUND

In computer systems where multiple disk drives are available, data may replicated and stored redundantly to reduce the risk of losing data when hardware failure occurs. The redundancy of data in such a system is intentional so that when a disk drive fails, the computer system can access the same data from the redundant disk drive. In addition to the intentional redundancy to reduce risk of data loss, unintentional redundant data may exist in a computer system. For example, multiple users of a shared system may store the same data item, or the same data item may be stored at different times. This duplication increases the size and therefore the cost of the system.

One solution to optimize the storage size is to store only one instance of the unique portion of each data item. Each data item, or asset, may be made up of asset parts. Some asset parts may be unique and other asset parts may be non-unique. The non-unique asset parts contain the same data and metadata as another asset or asset part, and the unique asset parts are the asset parts for which no match is found on the system or which are unique by their nature. For example, every asset has at least one unique portion because, by its nature, every asset is ingested into the storage system at a unique time. The system stores only one instance of a non-unique asset part, and this non-unique asset part would be referenced by the multiple assets or asset parts that contain that same non-unique portion. Thus, when users retrieve the multiple unique assets, they retrieve the related, non-unique asset parts from the same storage location.

For example, multiple users may receive the same email with an attachment. Each received email would have the same body and attachment, which are the non-unique asset parts associated with the email. However, each email is unique because it has a unique time received, status, flags, or other user-specific information. By storing the body and attachment only once, if five recipients store the same email, the storage system maintains only the five unique portions of the emails, one copy (or replica) of the body, and one replica of the attachment. Without such single instance storage mechanisms, the system would have to store the five unique portions of the emails, five replicas of the body, and five replicas of the attachment.

Further, in systems where redundancy is purposefully implemented, such as in a RAID 1 mirrored configuration, without single instance storage, the RAID 1 mirrored system would store ten emails (two replicas of each unique portion of the emails), ten replicas of the body, and ten replicas of the attachment. Instead, with single instance storage of non-unique asset parts as described above, the RAID 1 system would only store ten emails, two replicas of the body, and two replicas of the attachment. Thus, single instance storage of non-unique asset parts is even more advantageous in systems where even more redundancy is purposefully implemented.

To maintain the information necessary to reconstruct the original asset, some single instance storage systems maintain forward references from the asset to its asset parts. Using these forward references, the system can identify all asset parts that make up the original asset. In addition, such systems may use backward references from an asset part to the asset, or assets, that refer to it. Using these backward references, or "back references," the system can determine when the asset part can be safely destroyed or deleted (i.e. when the asset part has no back references to any assets).

Instead of maintaining the actual back references to assets in the data storage system, some such systems maintain a back reference count for each asset part. When such a system receives instructions to destroy an asset having asset parts, the system checks the asset's forward references to identify the corresponding asset parts. The system then checks the backward reference count of each corresponding asset part, decrements the back reference count by one, and if the count reaches zero, the system is authorized to destroy that asset part. However, if the backward reference count is non-zero after decrementing, the system will not destroy that asset part because the asset part is associated with another asset.

Implementing single instance storage of non-unique asset parts in redundant storage systems presents numerous problems because the forward references and backward references (or back reference count) for the asset and asset part replicas, which may be distributed across multiple nodes in the system, must also be maintained. One method to maintain an accurate back reference count in a distributed storage system utilizes distributed transactions, traditionally implemented using the two-phase commit protocol. However, this solution requires coordination among multiple nodes (or servers), is subject to interruption when one of the servers fails, and is difficult to scale when adding more servers to the system.

SUMMARY OF EXEMPLARY EMBODIMENTS

Additional objects and advantages will be set forth in part in the description which follows, and in part will be obvious from the description, or may be learned by practice of the embodiments. The objects and advantages will be realized and attained by means of the elements and combinations particularly pointed out in the appended claims.

Methods and systems are disclosed that relate to maintaining single instance storage of a plurality of asset parts in a data storage system. An exemplary method comprises using the data storage system comprising at least one processor and a plurality of disk drives for maintaining a journal associated with the plurality of asset parts, the journal comprising entries having generation numbers that are larger than generation numbers of previous entries. The generation number of an entry may correspond to an address of the entry in the journal, a count of entries from the beginning of the journal up to that entry or including that entry in the journal, a byte offset of the entry from the beginning of the journal, or a timestamp of the entry in the journal.

The journal may be stored in the data storage system in a stripe having metadata relating to the plurality of asset parts. Further, the method comprises creating a first entry to the journal corresponding to a request to add or remove a reference from an asset to an asset part, the first entry further comprising a first generation number assigned thereto. Finally, the method comprises performing a confirmation cycle, wherein the confirmation cycle comprises comparing the first generation number to a second generation number that is associated with the asset part, and, when the first generation number is larger than the second generation number, causing a reference count associated with the asset part to be changed. The second generation number that is associated with the asset part may comprise a confirmed generation number stored in metadata relating to that asset.

In one embodiment, the confirmation cycle may be performed periodically. In still another embodiment, the method further comprises replacing the second generation number with the first generation number atomically, wherein replacing further comprises causing the reference count associated with the asset part to be changed. In some embodiments, the second generation number is stored in metadata associated with the asset part.

In another embodiment, entries in the journal may be associated with an asset as well as an asset part, and prior to causing the reference count associated with the asset part to be changed, the method may check a status associated with the asset, and when the status indicates that the asset is eligible for change, the method may cause the reference count associated with the asset part to be changed. Further, when the status indicates that the asset is ineligible for change, the method may not cause the reference count associated with the asset part to be changed.

In yet another embodiment, the data storage system comprises a plurality of storage nodes, and further, each of the plurality of asset parts may comprise asset part content and asset part metadata, the asset part metadata being associated with a stripe having a journal. In this system, the asset part content and the stripe may be replicated across at least two of the plurality of nodes, forming at least one replicated asset part content and at least one replicated stripe having a replicated journal. When creating an entry in this system, the entry is also created in each replicated journal.

One of ordinary skill in the art will appreciate that the methods described herein may be embodied in various components of a computer system with at least one associated data storage subsystem. Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this disclosure, illustrate several embodiments of the invention and together with the description, serve to explain the principles of the invention. In the drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts. While several exemplary embodiments are described herein, modifications, adaptations, and other implementations are possible without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead the proper scope of the invention is defined by the appended claims.

Within the concept of this specification, a "data storage system" broadly refers to any data storage devices or memories such as hard disk drives, databases, or enterprise storage systems. A data storage system further includes any processors, programs, and applications accessing and/or managing the data storage devices or memories as well as communication links between the data storage devices or memories, and communication links between the processors, programs, and applications and the data storage devices or memories.

Figure 1:
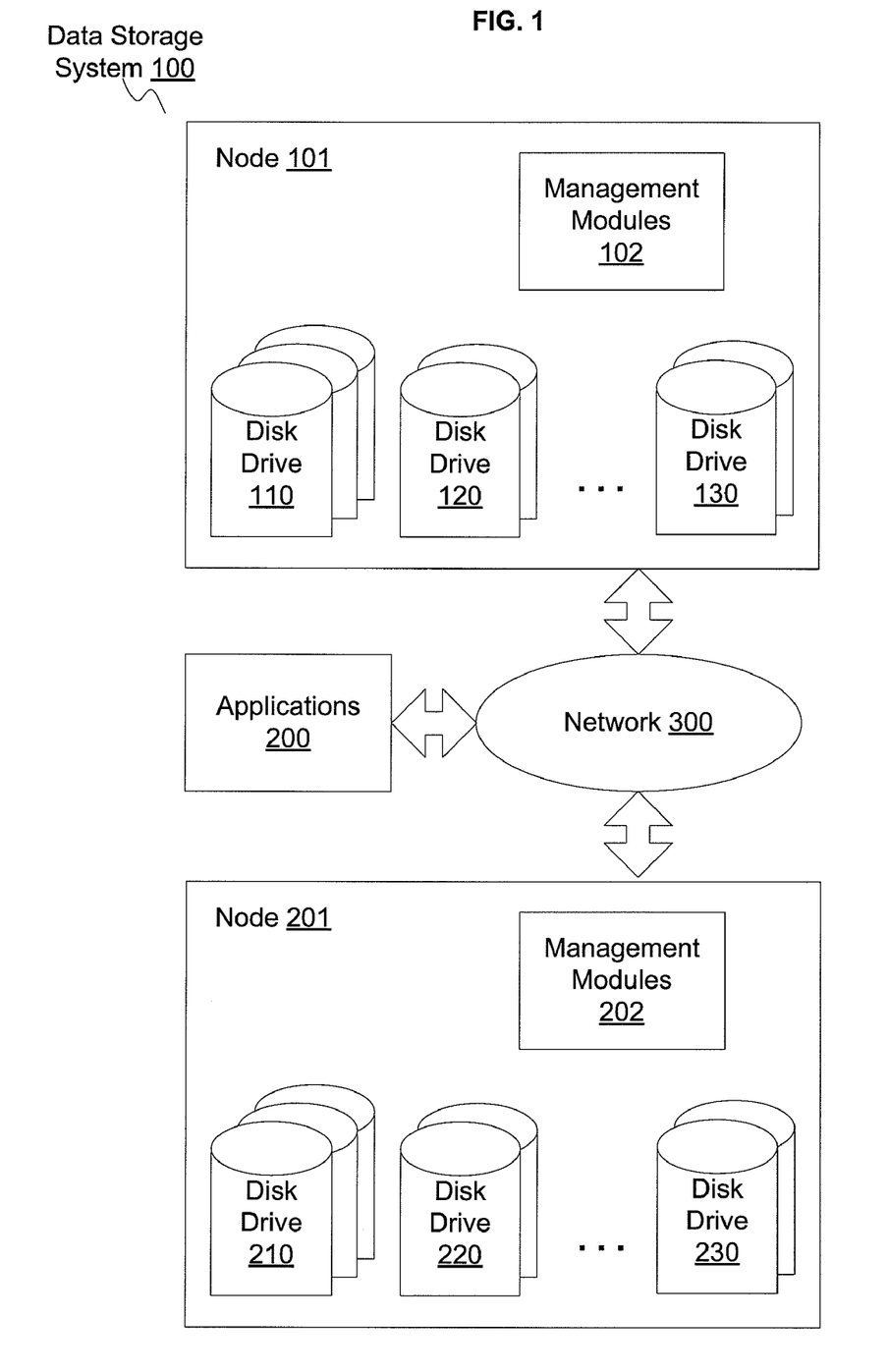
FIG. 1 illustrates an exemplary data storage system consistent with features and principles of the present invention.

FIG. 1 shows a data storage system 100 having a node 101 and a node 201. As used herein, a "node" refers to a subset of a data storage system having at least one associated disk drive. An example of a node is a server having one or more hard disk drives for storing data. The nodes in a data storage system may be in different geographical locations.

As used herein, a "disk drive" refers to any persistent memory accessible by a node, such as an internal or external hard drive. A disk drive may be a RAID drive made up of one or more physical storage devices. For simplicity, only three disk drives are shown in nodes 101 and 201 of data storage system 100. Disk drives 110, 120, and 130 are associated with node 101 and disk drives 210, 220, and 230 are associated with node 201. Although only a few nodes and disk drives are shown throughout the figures for simplicity, embodiments of the present invention can have any number of nodes and any number of disk drives.

Network 300 provides communications between various entities in data storage system 100, such as node 101, node 201, and applications 200. Network 300 may be a shared, public, or private network, may encompass a wide area or local area, and may be implemented through any suitable combination of wired and/or wireless communication networks. Furthermore, network 300 may comprise an intranet or the Internet. Applications 200 are any programs communicating with nodes 101 and 201, such as those retrieving data from the disk drives at the nodes. An exemplary application is a search engine, whereby a user can search for particular data stored in the data storage system 100.

Each node has management modules which include one or more processors, memory, and hardware, software, or firmware used to store and execute instructions to manage the data stored on the disk drives of that node. For example, management modules 102 implement algorithms for managing the data stored in disk drives 110, 120 and 130. The methods disclosed herein may be implemented by one or more of the management modules 102, 202, and additional management modules not depicted for simplicity. In alternative embodiments, the methods disclosed herein may be implemented by management modules external to the nodes, or by a combination of management modules internal to the nodes, such as management modules 102 and 202, and management modules external to the nodes communicating with the nodes via network 300. Further, in alternative embodiments, memory used by the management modules and instructions implemented by the management modules may be stored in a location on the data storage system external to the management modules themselves.

An "asset," as used herein, refers to one or more units of data. A single asset may correspond to data comprising what an end user application would consider to be a single file, such as a MICROSOFT Office Word™ document, or an email. Assets contain application metadata and one or more asset parts. The application metadata may contain the elements that an application applies in the process of managing the asset, such as annotations or retention data. Asset parts are portions of assets. In an illustrative embodiment, an asset part contains only immutable data, such as an archival copy of a document, but in other embodiments, asset parts may contain changeable data. Typically, the end user application performs the decomposition of an asset into its asset parts. In some embodiments, additional decomposition may be performed by the data storage system, or the decomposition into asset parts by an application may be replaced by the decomposition performed by the data storage system. In other embodiments, decomposition may be performed solely by the data storage system.

Figure 3:
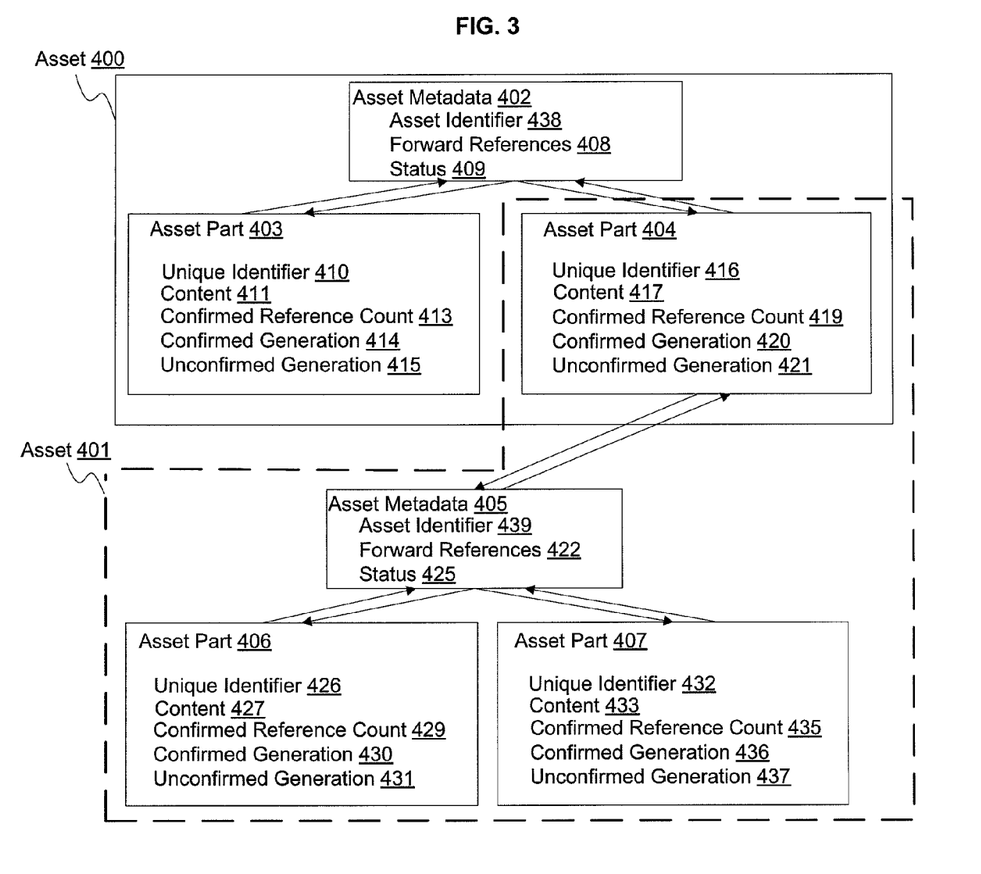
FIG. 3 illustrates exemplary assets and their corresponding asset parts consistent with features and principles of the present invention.

FIG. 3 shows exemplary assets 400 and 401. Asset 400 has two asset parts, 403 and 404. If asset 400 is an email, for example, asset part 403 may be the body text of the email and asset part 404 may be an attachment to the email. For another example, if asset 400 is a MICROSOFT Office Word™ document, asset part 403 may be the text and formatting information relating to the text, and asset part 404 may be an embedded figure in the document. In alternative embodiments, an asset may correspond to a portion of a file. Further, in alternative embodiments, more hierarchy may exist so that the asset parts themselves have child asset parts.

Exemplary asset 401 has three asset parts, 404, 406, and 407. Asset part 404 is common to both asset 400 and asset 401, making it non-unique. For example assets 400 and 401 may be emails (email A and email B) having different body text and one attachment in common. In this example, asset part 406 would represent the body text of asset 401 (email B), asset part 407 would represent the unique attachment to email B, and asset part 404 would represent the common attachment to asset 400 (email A) and asset 401 (email B). To optimize storage, only one logical instance of asset part 404 is stored on the data storage system. However, replicas of asset part 404 may exist in the data storage system for redundancy purposes. In an illustrative embodiment, assets are decomposed into asset parts and the content of the asset and asset parts is stored and replicated across the plurality of disk drives on a plurality of nodes in the data storage system using algorithms to achieve a level of redundancy that guarantees a selected acceptable level of risk of data loss due to disk drive failure.

Figure 2:
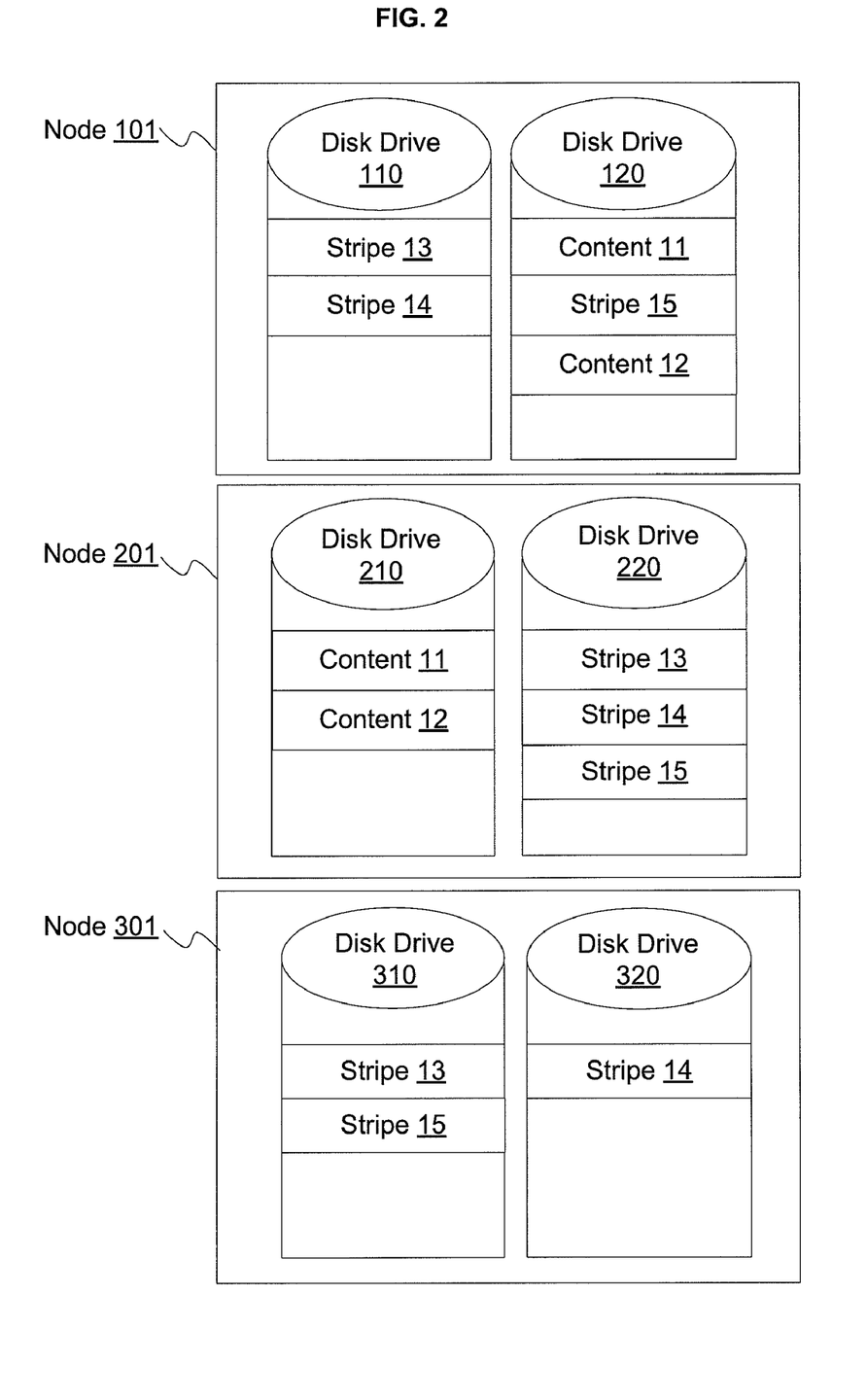
FIG. 2 illustrates exemplary storage devices in the data storage system of FIG. 1 configured for redundant storage of assets, consistent with features and principles of the present invention.

FIG. 2 shows exemplary content 11 and content 12, which represent the content of various assets and asset parts that were ingested into data storage system 100. Content 11 and 12 are replicated across two nodes, node 101 and node 201, so that there are two instances of each asset and asset part contained within content 11 and content 12. As noted above, the number of replicas should be chosen to achieve the desired level of redundancy, and in one illustrative embodiment, four replicas of content 11 and content 12 may be stored in data storage system 100. Generally, it is desirable to ensure that the replicas of content 11 and content 12 are distributed across multiple nodes, such that two replicas do not reside on the same node. Furthermore, content corresponding to asset parts that make up a particular asset may be stored on different nodes in the data storage system. For example, the content for asset part 404 may be stored on disk drive 120, the content for asset part 403 may be stored on disk drive 210.

In addition to storing asset and asset part content, data storage system 100 stores metadata associated with the assets and asset parts. This metadata is stored in stripes (or shards), which comprise metadata for a group of assets and/or asset parts. A stripe (or shard) is a grouping of data and/or metadata, formed from one or more logical partitions of data storage. The stripe that stores a particular object (data or metadata) should be computed in a deterministic manner, for example, by using an algorithm that chooses a stripe based on a unique identifier associated with the object. In this way, knowing the unique identifier of the object, data storage system 100 can determine which stripe contains the particular object.

FIG. 2 shows exemplary stripes 13, 14, and 15. The data storage system 100 stores replicas of stripes 13, 14, and 15, which are replicated across the plurality of nodes. FIG. 2 shows three replicas of exemplary stripes 13, 14, and 15 distributed across nodes 101, 201 and 301. The number of stripe replicas should also be chosen to achieve a desired level of redundancy, and in one embodiment, four replicas may be stored. In one illustrative embodiment, algorithms ensure that the content for an asset or asset part is stored on a separate disk drive than the metadata associated with the asset or asset part. For example, in such a system, if content 12 has the content of asset part 403, and stripe 13 contains storage metadata associated with asset part 403, then content 12 and stripe 13 would not be stored on the same disk drive. For example, FIG. 2 shows content 12 stored on disk drive 120 and disk drive 210, while stripe 13 is stored on disk drives 110, 220, and 310. Further, algorithms may ensure that content 12 and stripe 13 are always stored on separate nodes (not shown in FIG. 2). In alternative embodiments, content for an asset or asset part may reside on the same disk drive as the stripe containing storage metadata about that asset or asset part.

Each disk drive may contain a combination of stripes and content. For example, disk drive 120 contains content 11, content 12, and stripe 15. In alternative embodiments, each disk drive may be permitted to contain only content or only stripes. For example, in FIG. 2, node 201 has two disk drives 210 and 220, and disk drive 210 contains only content (content 11 and content 12) while disk drive 220 contains only stripes (stripes 13, 14, and 15). In other embodiments, all disk drives on a node may contain only content or only stripes.

In the exemplary embodiment of FIG. 3, asset metadata 402 comprises status 409, which is a data field indicating the status of the asset, such as "unknown," "pending," "valid," "failed," or "destroyed." This field is set by algorithms in the data storage subsystem to signify the status of the asset. Such an algorithm may be configured to ensure that new assets ingested into data storage system 100 are fully ingested (i.e. an asset may be considered fully ingested when all of the associated asset parts' content and metadata and the asset's content and metadata are stored replicated). In one embodiment, the asset 400 is replicated to various nodes of the data storage system to ensure redundancy, and while the replication is in progress, status 409 is "pending." When the replication is completed, the data storage system 100 sets the status 409 to "valid" for each replica of the asset. The "pending" status has an associated time out period, and if the status is not changed to "valid" within that period, the status is instead marked "failed." In one embodiment, increments to a back reference count associated with the asset parts referenced by an asset do not occur unless the status of the asset is "valid."

Further, an algorithm may be configured to ensure that assets being deleted from the data storage system 100 are properly deleted (i.e. all memory locations containing the deleted asset have been overwritten and/or future access to the deleted asset is prevented). In one embodiment, the asset 400 is replicated to various nodes of the data storage system to ensure redundancy, and while the deletion is in progress, the status 409 remains "valid." When the deletion is completed, the data storage system 100 sets status 409 to "destroyed" for each replica of the asset. In one embodiment, decrements to a back reference count associated with the asset parts referenced by an asset do not occur unless the status of the asset is "destroyed." Further, when the status of an asset is "unknown," "pending," or "failed," increments or decrements to the associated asset part's back reference count may be prevented. Using the methods disclosed herein, a particular instruction to increment or decrement an asset part's back reference count should occur only once each time the associated asset's status has made the appropriate transition (i.e. "pending" to "valid" or "valid" to "destroyed.")

Asset metadata 402 also comprises a unique identifier, asset identifier 438, which represents a unique number assigned to the asset that distinguishes the asset from all other assets stored in data storage system 100. The system may use this unique identifier to retrieve a particular asset. Asset metadata 402 further comprises forward references 408, which indicate the asset parts that are associated with asset 400. Forward references 408 may be used by the data storage system in response to a user request to retrieve asset 400. To retrieve asset 400, the data storage system uses forward references 408 to identify either the address of the asset parts 403 and 404, or a location where the address for the asset parts 403 and 404 can be found. For example, the forward references 408 may contain the unique identifiers 410 and 416 of associated asset parts 403 and 404. Using these unique identifiers, the data storage system 100 could consult a table of addresses, not shown, indexed by the unique identifiers to locate asset parts 403 and 404.

Unique identifiers 410 and 416 are unique numbers assigned to each asset part when the asset part is created in the data storage system. In an illustrative embodiment, the unique identifier is derived from the hash value of the content of the asset part. In one embodiment, the data storage system utilizes a known cryptographic hash algorithm such as SHA-256 to create a hash value of the content, ensuring that fewer than 1 in $2^{256}$ asset parts will be assigned the same unique identifier.

Each asset part has associated asset part metadata that may be stored with the content of the asset part or may be stored in a separate location, such as in a page within a stripe. For example, data storage system 100 may store asset part metadata 503 in a storage metadata record, such as record 30, which is one of the records among the storage metadata records 500 (or one of the records on the "page") in stripe 15 shown in FIG. 4. The associated metadata for asset part 403 of FIG. 3, for example, may include unique identifier 410, confirmed reference count 413, confirmed generation 414, and unconfirmed generation 415. In the illustrative example of FIG. 3, the confirmed reference count 413, confirmed generation 414, and unconfirmed generation 415 are numerical values. These values are initialized to zero when the asset part is created on the data storage system and are updated according to the methods disclosed herein.

Figure 4:
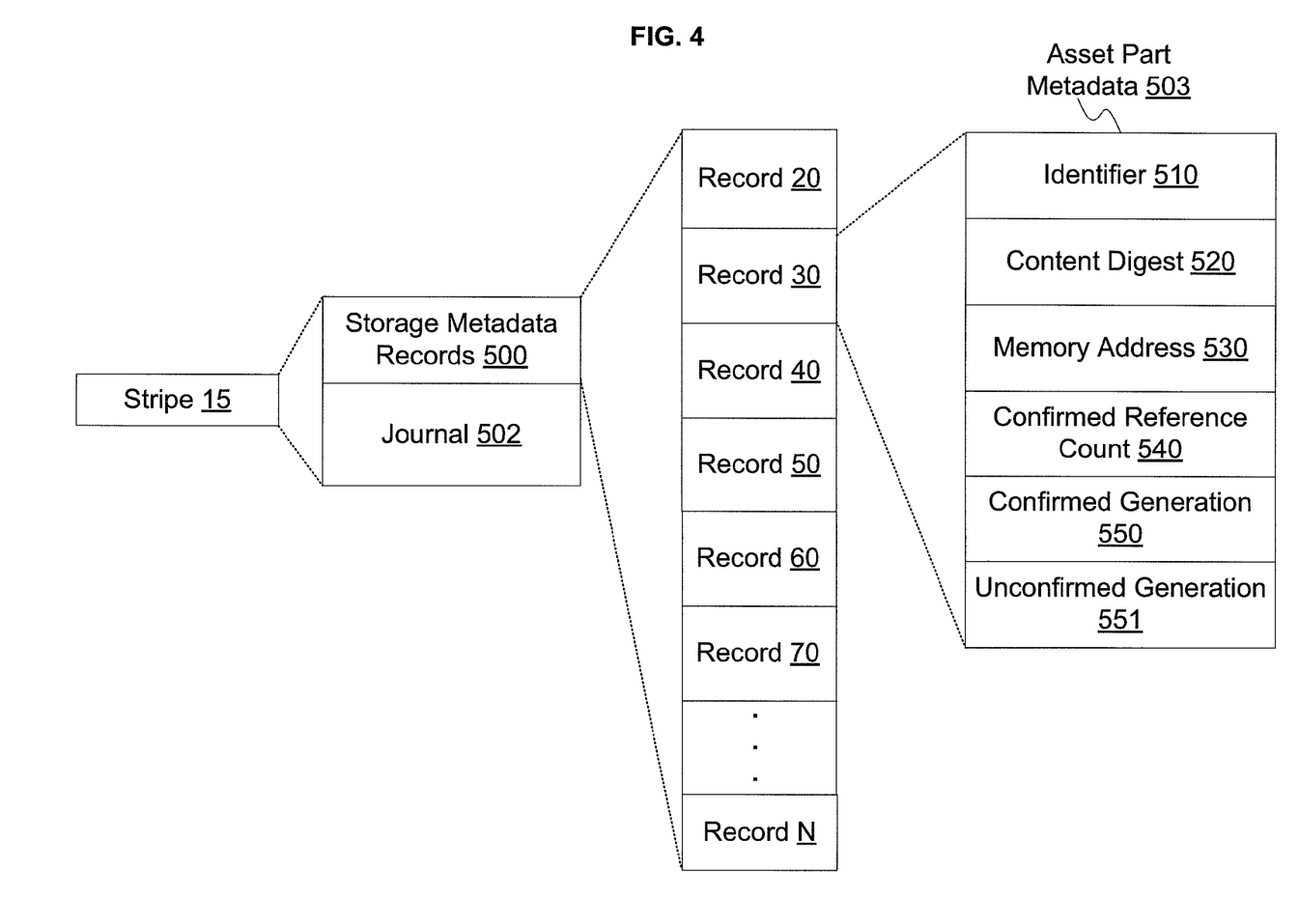
FIG. 4 illustrates data contained within an exemplary stripe of the storage devices of FIG. 2.

FIG. 4 illustrates exemplary stripe 15 in detail. Stripe 15 contains a storage metadata record for each of the asset parts associated with stripe 15. In an illustrative embodiment, 256 records comprise storage metadata records 500, but in alternative embodiments any number of records could be associated with a stripe. One exemplary storage metadata record 30 containing asset part metadata 503 is shown in detail in FIG. 4. Asset part metadata 503 includes a unique asset part identifier 510. Asset part metadata 503 also includes a content digest 520; however, in alternative embodiments, the identifier 510 and content digest 520 may be the same data item. Asset part metadata 503 further includes confirmed reference count 540, confirmed generation 550, unconfirmed generation 551, and memory address 530. Memory address 530 defines the location of the associated asset part content on data storage system 100 and may comprise an identifier of a disk drive where the asset part content may be found, a pointer to a memory location, or other information from which the location of the asset part content could be derived. When retrieving a particular asset part, the data storage system may locate the asset part metadata 503 corresponding to the particular asset part in storage metadata records 500 by using the identifier 510 and subsequently retrieving the asset part content stored at memory address 530.

In one illustrative embodiment, the metadata associated with a record in the storage metadata records 500 is located on the same disk sector. This helps to ensure that portions of asset part metadata 503 (such as the confirmed reference count 540 and confirmed generation 550) can be atomically updated. Further, the data storage system 100 may also incorporate a checksum into the record 30 to verify that the record has been correctly written to, such that a partial write would cause a subsequent checksum verification to fail.

Figure 5:
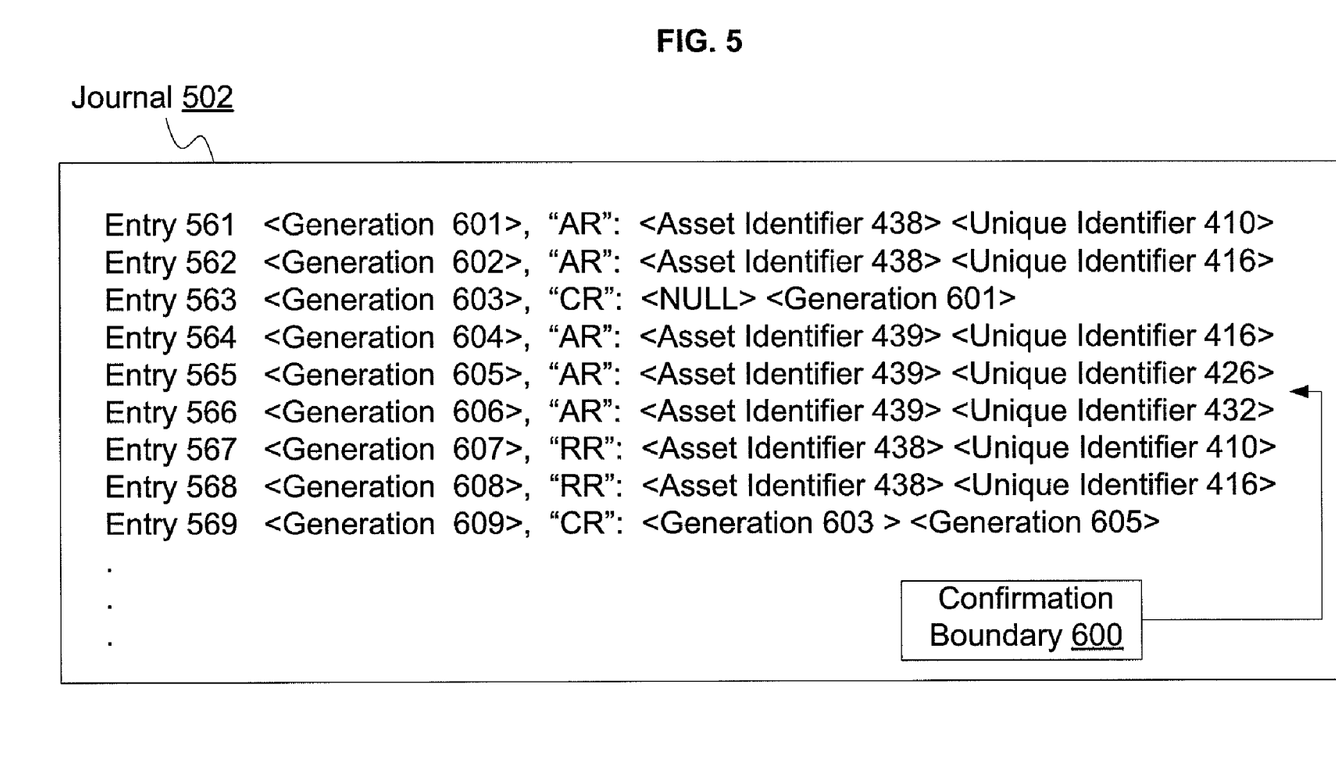
FIG. 5 illustrates an exemplary journal associated with the stripe of FIG. 4 that may be used to implement the methods and systems consistent with the features and principles of the present invention.

In addition, stripe 15 has a journal 502 for maintaining information regarding work to be performed on the assets and/or asset parts associated with the stripe 15. In one illustrative embodiment, all actions to be performed on assets and asset parts associated with the stripe 15 correspond to an entry in the journal 502. FIG. 5 illustrates the exemplary journal 502 in detail. The syntax used in the exemplary journal 502 is for explanatory purposes only, and the syntax used in a journal consistent with the principles of the present invention could comprise any syntax that the management modules of the data storage system could understand and implement.

Since every action relating to storage metadata records 500 corresponds to an entry in journal 502, in the event of a system failure, the last state of the storage metadata records 500 could be recovered by replaying the journal entries from the start of journal 502. As detailed herein, the data storage system 100 uses journal 502 to maintain the correct reference count for an asset, which is the count of the number of assets that are associated with that asset part.

Exemplary journal 502 has nine entries. Each entry is associated with a generation to uniquely identify the entry. The generation number is implemented such that the sequence of the entries is preserved. For example, if entry 562 occurs after entry 561, the generation associated with entry 562, generation 602, is larger than the generation associated with entry 561, generation 601. For example, the generation may comprise either an incrementing number or a byte-offset from the beginning memory address of the journal entries. In one embodiment, the generation is a unique 64-bit address that increases monotonically for the next entry to be added to the journal. Alternatively, the journal entries may be associated with a timestamp in lieu of, or in addition to, the generation.

The journal entries represent an intention by the data storage system 100 to perform some action, or a record of having performed some action. For example, entry 561, "AR," represents the intention to add a back reference from asset part 403, identified by unique identifier 410, to asset 400 identified by unique identifier 438. Thus, executing entry 561 should result in an increment of the confirmed back reference count 413 of asset part 403. Similarly, entry 567, "RR," represents the intention to remove a back reference from asset part 403 to asset 400. Thus, executing entry 567 should result in a decrement of the confirmed back reference count 413 of asset part 403.

In the exemplary journal 502, entry 563, "CR," represents an indication that a confirmation cycle has occurred on stripe 15. In the exemplary embodiment disclosed herein, the confirmation cycle is a process by which the data storage system 100 executes the intentions listed as entries in the journal 502. In one embodiment, confirmation cycles run periodically. Since more entries may be added to the journal while a confirmation cycle is occurring, the last entry in the journal prior to confirmation should be identified. In FIG. 5, this information is represented by confirmation boundary 600. For example, if the confirmation cycle identified in entry 569 begins just after entry 565 is written to the journal 502, confirmation boundary 600 would contain data identifying generation 605. In the illustrative embodiment shown in FIG. 5, confirmation boundary 600 may be written in the journal 502. In alternative embodiments, confirmation boundary 600 may be maintained elsewhere on data storage system 100.

A confirmation cycle may be performed by a confirmation manager or other module executed by data storage system 100. In one embodiment, the cycle may be performed by management modules 102 or 202 shown in FIG. 1. The confirmation cycle may begin by reviewing the journal 502. If the generation of the last entry in the journal 502 is greater than the confirmation boundary 600, unconfirmed entries exist in journal 502. In the exemplary embodiment depicted in FIG. 5, for example, the confirmation boundary 600 contains generation 605, which is the last confirmed generation in journal 502. The confirmation cycle would then attempt to confirm each entry in the journal 502 having a generation greater than generation 605. For each entry to be confirmed, the confirmation manager verifies the status associated with the asset identified in the entry, and if the status is "valid," "failed," or "destroyed," confirmation can proceed. For example, when attempting to confirm entry 566, the confirmation manager checks status 425 of asset 401, which is identified in entry 566 by asset identifier 439. If the status is "valid," confirmation proceeds for entry 566, which seeks to add to the reference count of asset part 407 (identified in entry 566 by unique identifier 432). In some embodiments, this verification may be done in a batch process, where the confirmation manager verifies the status associated with all assets associated with unconfirmed entries in the journal.

To complete the confirmation, data storage system 100 updates the confirmed generation and the confirmed reference count associated with the asset part. First, the confirmed generation associated with the asset part should be verified to be lower than the generation of the entry being confirmed. If the confirmed generation of the asset part is equal to or greater than the generation of the entry being confirmed, then the entry has already been confirmed and the confirmation manager should not proceed in performing the action indicated by that entry on the asset part. For example, to complete the confirmation of entry 566, the confirmation manager should verify that the confirmed generation 436 of asset part 407 is lower than generation 606, which is the generation of entry 566. If generation 436 is lower than generation 606, then the confirmed generation 436 of asset part 407 is updated to contain the generation of entry 566 (generation 606), and the confirmed reference count 435 is increased by one. Preferably, the change in the confirmed reference count and the update to the confirmed generation number of the asset part are performed atomically by the data storage system 100. By updating the confirmed generation number of the asset part, data storage system 100 prevents the same entry from being performed more than once.

Once the confirmation cycle has completed, the CR entry, such as entry 563 or 569, is written to the journal 502. The CR entry may comprise the generation of the last CR entry as well as the generation corresponding to the last journal entry that has been confirmed, or the confirmation boundary. For example, if the confirmation cycle began just after entry 565 was written to the journal and completed just after entry 568 was written to the journal, the CR entry (entry 569) may identify generation 603, representing the generation of the previous CR entry (entry 563), and generation 605, representing the generation of the last entry that was confirmed in that cycle (entry 565). In alternative embodiments, in lieu of the generation of the last entry that was confirmed in the cycle, the CR entry may comprise the first unconfirmed entry. In the foregoing example, the first unconfirmed entry would be entry 566, corresponding to generation 606. Therefore, as shown in FIG. 5, the CR entry 569 may identify generation 606.

Entries that represent the intention to perform some action on an asset part, such as entry 561 in journal 502, are written to each replica stripe. For example, if the metadata associated with asset part 403 is contained in stripe 15, shown in FIG. 2, then entry 561 to journal 502 would be replicated to the journal associated with stripe 15 on each of disk drives 120, 220, and 310.

In some embodiments, the intended action on an asset part (or entry in the journal 502) cannot be confirmed until all journals for replica stripes are updated with the entry. However, in embodiments where all updates to storage metadata records 500 are written to the journal 502, it is unnecessary to delay the confirmation of entries in the journal 502.

When the data storage system 100 receives a request to add a new asset part, the system first checks previously stored asset parts for an instance of the new asset part. This checking may be performed by hashing the content of the new asset part to create a content digest for that asset part. The digest can then be compared to the content digests of asset parts already stored in the data storage system 100. If a match is found, the data storage system 100 adds an entry to the journal corresponding to the stripe containing the metadata for that asset part. This entry indicates that the reference count for that asset part should be increased.

For example, entry 561 at generation 601 corresponds to an intention to add a reference to an asset part 403, which is indicated in FIG. 5 as "AR." The entry further comprises the identifier 438 of the asset 400 having a forward reference to the asset part 403, and the unique identifier 410 of the asset part 403. If the exemplary asset 400 of FIG. 3 were ingested (i.e. a request to store asset 400 is received by the data storage system 100), at least two "AR" entries in the journal 502 may be created, for example, entry 561 and entry 562. Entry 561 would record the storage of asset part 403 and its association with asset 400, and entry 562 would record the storage of asset part 404 and its association with asset 400. Thus, when the intentions represented in entry 561 and entry 562 are completed, and asset 400 is ingested, the confirmed back reference counts 413, 419 of asset parts 403, 404 would be increased. In another embodiment, the metadata for asset parts 403 and 404 may be in different stripes within data storage system 100. For example, the metadata for asset part 403 may be in stripe 13 and the metadata for asset part 404 may be on stripe 14. In this case, the aforementioned entries would be made in the appropriate journal (i.e. entry 561 would be created in the journal associated with stripe 13 and entry 562 would be created in the journal associated with stripe 14).

In one embodiment, the generation 601 corresponding to entry 561 would be written to the unconfirmed generation 415 associated with asset part 403 when the journal entry 561 is created. Similarly, the generation 602 corresponding to entry 562 would be written to the unconfirmed generation 421 of asset part 404 when the journal entry 562 is created. The system may later utilize these unconfirmed generation numbers to update the confirmed reference counts 413 and 419 during a confirmation cycle using the methods disclosed herein.

When the data storage system receives a request to remove an asset, the system first identifies all of the asset parts referred to by that asset. In the corresponding journals for the asset parts, the system adds an entry indicating that the reference count for the asset part should be decreased. When the reference count for the asset part reaches zero, the asset part can be deleted.

For example, entry 567 at generation 607 corresponds to an intention to remove a reference to an asset part 403, which is indicated in FIG. 5 as "RR." The entry further identifies the unique identifier of the asset having a forward reference to the asset part, and the identifier of the asset part. If the exemplary asset 400 of FIG. 3 were to be deleted (i.e. a request to remove asset 400 is received by the data storage system), at least two "RR" entries in the journal may be created, for example, entry 567 and entry 568. Entry 567 would comprise the asset identifier 438 of asset 400, and the unique asset part identifier 410 of asset part 403. Entry 568 would comprise the asset identifier 438 of asset 400, and the unique asset part identifier 416 of asset part 404. Thus, when the intentions represented in entry 567 and entry 568 are completed, the back reference counts 413, 419 of asset parts 403, 404 would be decreased since the asset 400 has been removed from the data storage system.

In one embodiment, the generation 607 corresponding to entry 567 would be written to the unconfirmed generation 415 associated with asset part 403 when the journal entry 567 is created. Similarly, the generation 608 corresponding to entry 568 would be written to the unconfirmed generation 421 of asset part 404 when the journal entry 568 is created. The system may later utilize these unconfirmed generation numbers to update the reference counts 413, 419 during a confirmation cycle using the methods disclosed herein.

Because the journal establishes a record of all actions to be performed on the asset parts stored on the corresponding stripe, as well as a record of when confirmation cycles occurred, the reference count for an asset part can be recomputed by analyzing the journal files for the asset part since the beginning of the journal. In one embodiment, such as that shown in FIG. 3, the generation of the last confirmed reference count, confirmed generation 414, is also associated with asset part 403 and represents the generation number corresponding to the generation number of the last action completed (confirmed) relating to asset part 403. Thus, to verify confirmed reference count 413 of asset part 403, data storage system 100 need analyze the journal entries for generations up to the confirmed generation number 414.

In one embodiment, journal entries are always appended to the end of the journal so that a complete record of the journal entries is maintained. Further, the journal may be a file having a fixed length capacity. When the journal file has reached capacity, new entries may be written to a new journal file. Once all entries in a given journal file are confirmed, the journal file is eligible to be retired, and may be replaced by a new journal file. The data storage system may archive or delete the retired journal file.

Figure 6:
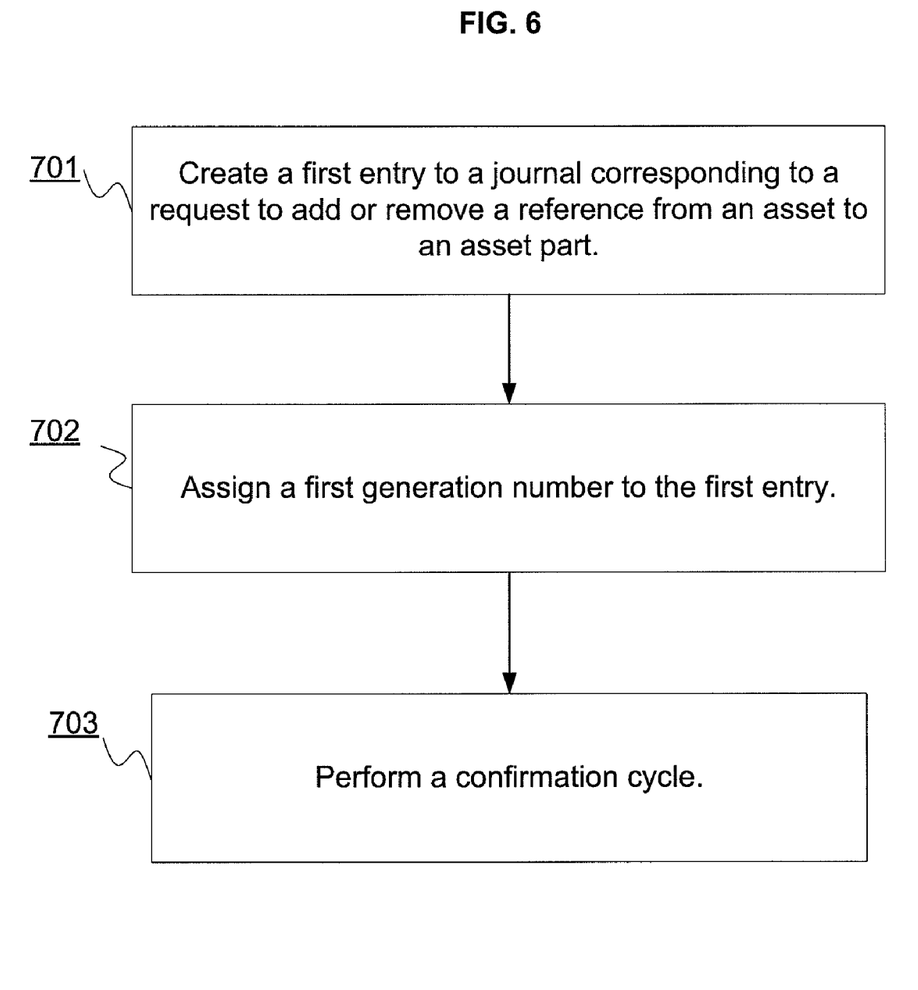
FIG. 6 illustrates an exemplary method performed in the data storage system of FIG. 1 consistent with the features and principles of the present invention.

FIG. 6 shows an exemplary method consistent with the principles of the present invention. When a request to add or remove an asset is received, as shown in stage 701, the data storage system 100 creates a first entry to a journal. To keep track of references from assets to asset parts, a reference count is associated with each asset part associated with the asset that is the subject of the request. A request to add an asset corresponds to a request to add a reference from an asset to an asset part, and therefore should increase the reference count associated with the asset part. For example, referring to FIG. 5, entry 564 in journal 502 represents the request to add a reference from asset 401 to asset part 404, and, therefore, requests an increase to the confirmed reference count 419 associated with asset part 404. Similarly, a request to remove an asset corresponds to a request to remove a reference from an asset part, and therefore should decrease the reference count associated with the asset part. For example, referring to FIG. 5, entry 567 in journal 502 represents the request to remove a reference from asset 400 to asset part 403, and, therefore, requests an decrease of the confirmed reference count 413 associated with asset part 403. In the method of FIG. 6, the first entry to the journal corresponds to a request to add or remove a reference from an asset part. Exemplary journal entries are shown in FIG. 5 (entries 561-569), but may take any form that provides the data storage system with the information required to locate the appropriate asset or asset part and to perform an increment or decrement operation on the reference count associated with the asset that is the subject of the operation.

Figure 7:
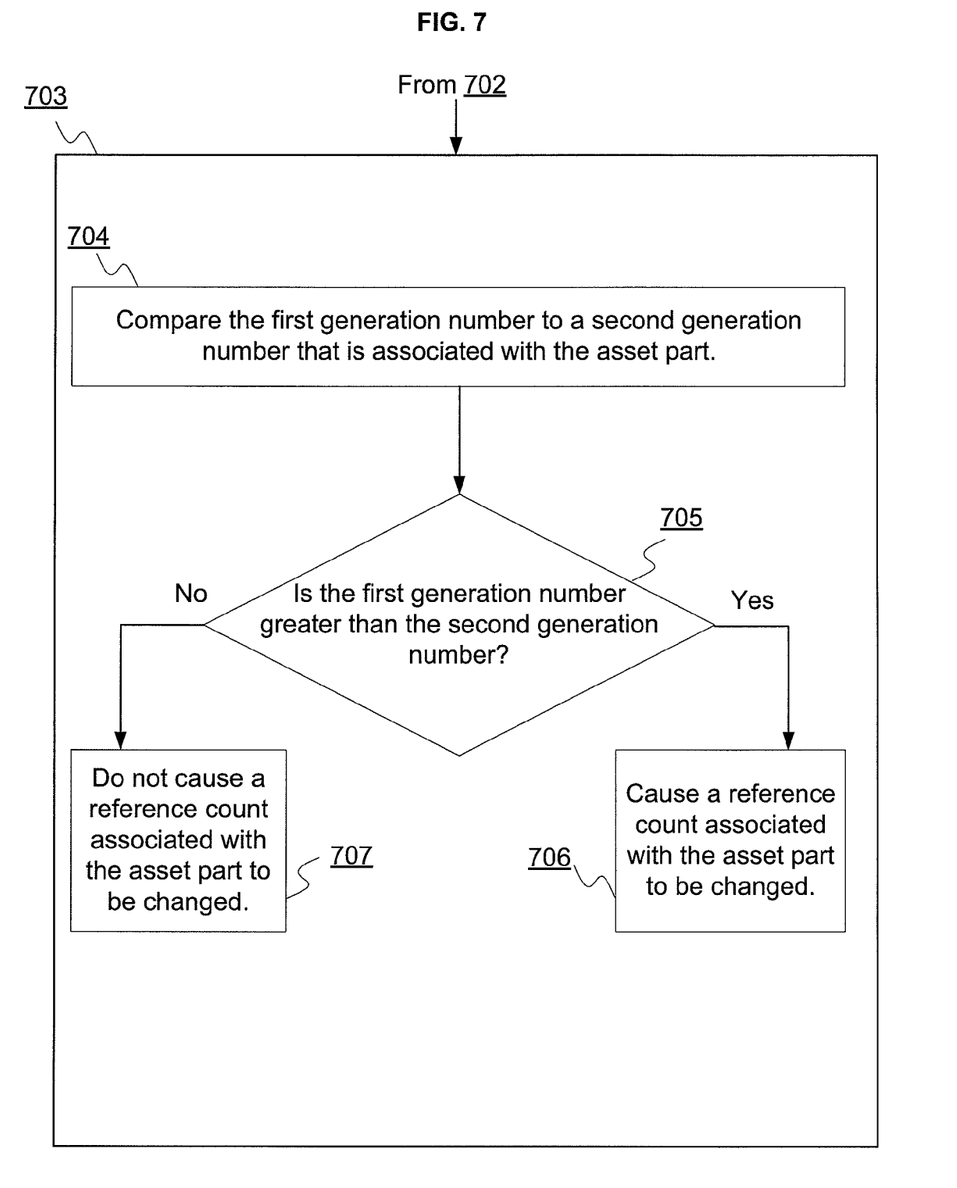
FIG. 7 illustrates a detailed portion of the method shown in FIG. 6 consistent with the features and principles of the present invention.

In stage 702, a first generation number is assigned to the first entry to the journal. This generation number may then be used during a confirmation cycle, shown in stage 703. FIG. 7 details stage 703. Stage 703 may begin with stage 704, in which the first generation number, which was assigned to the first entry, is compared to a second generation number that is associated with the asset part itself. The second generation number may be stored with the asset part or separately in a record associated with the asset part, such as in metadata record 30 of FIG. 4. This second generation number, represented, for example, in FIG. 4 as "confirmed generation 550," represents the generation of the last journal entry that was confirmed relating to that asset part and is initialized to zero when the asset part is first created. In one embodiment, when the confirmation cycle is completed, the second generation number associated with the asset part is replaced with the first generation number corresponding to the most recent journal entry that has been confirmed for the asset part. In another embodiment, a generation number corresponding to the last confirmed entry in the journal (which may or may not be associated with the asset part) replaces the second generation number. In this way, the confirmed generation associated with the asset represents that last entry in the journal that has been confirmed. In one illustrative embodiment, the second generation associated with the asset part and the reference count are updated atomically.

In one embodiment, the first generation number may also be associated with the asset part as an unconfirmed generation, such as unconfirmed generation 551 in FIG. 4. Each time an entry relating to the asset part is added to the journal, the system writes the generation of that entry to the unconfirmed generation associated with the asset part. The unconfirmed generation may be used by the data storage system 100 as an indicator of the most recent record in the journal that involves the asset part. Thus, the entries associated with generations prior to the unconfirmed generation 551 in the asset part metadata 503 but subsequent to the confirmed generation 550 are those that have yet to be confirmed.

Maintaining knowledge of the unconfirmed generation for an asset part saves system resources since updating the asset part's back reference count would only involve confirming the entries corresponding to generations prior to and including the unconfirmed generation. If subsequent entries were appended to the journal, the system would not have to analyze these entries because the unconfirmed generation represents the last entry in the journal that affects the asset part in question. By the same logic, maintaining knowledge of the confirmed generation for an asset part saves system resources because the data storage system is assured that journal entries having generation numbers lower than the confirmed generation have been incorporated into the asset part's metadata record.

Generally, when the asset part's unconfirmed generation number is greater than the asset part's confirmed generation number, this serves as an indicator to the data storage system 100 that some actions on that asset part may not be appropriate. For example, a destruction algorithm seeking to delete an asset part could compare the unconfirmed generation and the confirmed generation of that asset part to determine if deletion is appropriate. Returning to FIG. 4, if the unconfirmed generation 551 in asset part metadata 503 is greater than the confirmed generation 550, then deletion of the corresponding asset part would not be appropriate because this indicates that there may be an entry in the journal that seeks to add to the reference count 540 of that asset part.

In stage 705, the method compares the first generation number with the second generation number. When the first generation number is greater than the second generation number, in stage 706, the method causes a reference count associated with the asset part to be changed. In the case of an addition of a reference to the asset part, the reference count would be increased, and in the case of a deletion of a reference to the asset part, the reference count would be decreased. If the first generation number is less than the second generation number, in stage 707 the reference count associated with the asset part is not changed. When the reference count is changed, a new value is written to the reference count associated with the asset part. For example, referring to FIG. 4, the confirmed reference count 540 would be updated with the new value.

In one embodiment, the confirmation cycle in stage 705 is performed periodically, and multiple journal entries, which may relate to a plurality of asset parts, are confirmed during the same confirmation cycle. For example, referring to FIG. 5, when the time arises for the periodic confirmation cycle to occur, all entries in journal 502 having generations larger than the value of the confirmation boundary 600 may be confirmed.

Further, in some embodiments, the confirmation cycle does not cause the reference count associated with the asset part to change because in some instances, the asset referencing that asset part has a status that makes it ineligible to be changed. For example, if the asset status is "pending," the reference count of the asset part should not be changed.

In other embodiments, the start of a confirmation cycle may be contingent on an indicator from the data storage system 100 that a confirmation cycle should begin. For example, a node may initiate a confirmation cycle by issuing a request. This request may contain a list of unique asset identifiers for asset parts whose reference count needs to be confirmed. The list may be generated by comparing the unconfirmed generation of each asset part associated with the asset with its confirmed generation. If the confirmed generation is smaller than the unconfirmed generation, then that asset part's reference count needs to be confirmed and would be added to the list.

In one embodiment, metadata associated with a group of asset parts is stored in a stripe, and the journal is associated with the stripe. The stripe may be replicated across a plurality of nodes in the data storage system such that there are replicated stripes having replicated journals associated therewith. When an entry relating to an asset part whose metadata is stored on the stripe is written to the journal, that same entry should be written to each of the replicated journals. In addition, entries indicating that a confirmation cycle has occurred are also written to each of the replicated journals. For example, referring to FIG. 5, entry 569 would be written to each of the journals corresponding to the replicas of stripe 15 (exemplary replicas of stripe 15 are shown in FIG. 2.) In one illustrative embodiment, only one of the journals serves as a primary journal and the confirmation cycle is configured to execute or confirm the entries of the primary journal. A replica journal could become the primary journal in a failover situation, where the disk drive containing the stripe having the primary journal has failed.

The methods disclosed herein are especially useful in computer systems utilizing an enterprise storage system, however, one of ordinary skill in the art will appreciate that the features and principles of the present invention may be implemented in various computer systems. One of ordinary skill in the art will also appreciate that features and principles of the present invention may be implemented in different components of a computer system with at least one associated data storage subsystem. Similarly, one of ordinary skill in the art will also appreciate that computer readable program code to implement a method consistent with features and principles of the present invention may be stored on various media, including various persistent memory devices.

The methods and systems disclosed herein may also be useful in computer systems implementing a garbage collection scheme that frees unused memory for use by the computer system.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for maintaining single instance storage of a plurality of asset parts in a data storage system comprising a plurality of storage nodes, the method comprising:
using at least one processor for:
maintaining a journal associated with the plurality of the asset parts, the journal comprising entries having generation numbers that are larger than generation numbers of previous entries;
creating a first entry to the journal corresponding to a request to add or remove a reference from an asset to an asset part, the first entry further comprising a first generation number assigned thereto;
performing a confirmation cycle, wherein the confirmation cycle comprises comparing the first generation number to a second generation number that is associated with the asset part, and when the first generation number is larger than the second generation number, causing a reference count associated with the asset part to be changed; and wherein each of the plurality of asset parts comprises asset part content and asset part metadata, the asset part metadata being associated with a stripe, wherein the asset part content and the stripe are replicated across at least two of the plurality of storage nodes, forming at least one replicated asset part content and at least one replicated stripe having a replicated journal, and wherein creating the first entry further comprises creating the first entry in the replicated journal.

2. The method of claim 1, wherein the confirmation cycle is performed periodically.

3. The method of claim 1, wherein the second generation number is stored in metadata associated with the asset part.

4. The method of claim 1, further comprising atomically replacing the second generation number with the first generation number and causing the reference count associated with the asset part to be changed when the first generation number is larger than the second generation number.

5. The method of claim 4, wherein the first generation number comprises a numerical value selected from the group consisting of an address of the first entry, a count of entries in the journal from a beginning entry to the first entry, a byte offset of the first entry from a beginning memory location of the journal, and a first time stamp reflecting a creation time of the first entry.

6. The method of claim 1, wherein the first entry comprises an identifier of the asset, and wherein performing the confirmation cycle further comprises:

prior to causing the reference count associated with the asset part to be changed, checking a status associated with the asset;

when the status indicates that the asset is eligible for change, causing the reference count associated with the asset part to be changed; and when the status indicates that the asset is ineligible for change, not causing the reference count associated with the asset part to be changed.

7. A data storage system for maintaining single instance storage of a plurality of asset parts, the data storage system comprising:

a plurality of disk drives storing assets and a plurality of asset parts; at least one processor configured to maintain a journal associated with the plurality of the asset parts, the journal comprising entries having generation numbers that are larger than generation numbers of previous entries;

create a first entry to the journal corresponding to a request to add or remove a reference from an asset to an asset part, the first entry further comprising a first generation number assigned thereto; and perform a confirmation cycle, wherein the confirmation cycle comprises comparing the first generation number to a second generation number that is associated with the asset part, and when the first generation number is larger than the second generation number, causing a reference count associated with the asset part to be changed; and a plurality of storage nodes, wherein each of the plurality of asset parts comprises asset part content and asset part metadata, the asset part metadata being associated with a stripe, wherein the asset part content and the stripe are replicated across at least two of the plurality of storage nodes, forming at least one replicated asset part content and at least one replicated stripe having a replicated journal, and wherein creating the first entry further comprises creating the first entry in the replicated journal.

8. The data storage system of claim 7, wherein the at least one processor is configured to perform the confirmation cycle periodically.

9. The data storage system of claim 7, wherein the second generation number is stored in metadata associated with the asset part.

10. The data storage system of claim 7, wherein the at least one processor is further configured to atomically replace the second generation number with the first generation number and cause the reference count associated with the asset part to be changed when the first generation number is larger than the second generation number.

11. The data storage system of claim 10, wherein the first generation number comprises a numerical value selected from the group consisting of an address of the first entry, a count of entries in the journal from a beginning entry to the first entry, a byte offset of the first entry from a beginning memory location of the journal, and a first time stamp reflecting a creation time of the first entry.

12. The data storage system of claim 7, wherein the first entry comprises an identifier of the asset, and wherein performing the confirmation cycle further comprises:

prior to causing the reference count associated with the asset part to be changed, checking a status associated with the asset;

when the status indicates that the asset is eligible for change, causing the reference count associated with the asset part to be changed; and when the status indicates that the asset is ineligible for change, not causing the reference count associated with the asset part to be changed.

13. A non-transitory computer readable medium comprising executable instructions maintaining single instance storage of a plurality of asset parts in a data storage system comprising a plurality of storage nodes, the instructions, when executed by a computer system, causing the computer system to:

maintain a journal associated with the plurality of asset parts, the journal comprising entries having generation numbers that are larger than generation numbers of previous entries;

create a first entry to the journal corresponding to a request to add or remove a reference from an asset to an asset part, the first entry further comprising a first generation number assigned thereto; and perform a confirmation cycle, wherein the confirmation cycle comprises comparing the first generation number to a second generation number that is associated with the asset part, and when the first generation number is larger than the second generation number, causing a reference count associated with the asset part to be changed; and wherein each of the plurality of asset parts comprises asset part content and asset part metadata, the asset part metadata being associated with a stripe, wherein the asset part content and the stripe are replicated across at least two of the plurality of storage nodes, forming at least one replicated asset part content and at least one replicated stripe having a replicated journal, and wherein creating the first entry further comprises creating the first entry in the replicated journal.

14. The non-transitory computer readable medium of claim 13, wherein the instructions cause the computer to perform the confirmation cycle periodically.

15. The non-transitory computer readable medium of claim 13, wherein the second generation number is stored in metadata associated with the asset part.

16. The non-transitory computer readable medium of claim 13, wherein the instructions cause the computer to atomically replace the second generation number with the first generation number and cause the reference count associated with the asset part to be changed.

17. The non-transitory computer readable medium of claim 16, wherein the first generation number comprises a numerical value selected from the group consisting of an address of the first entry, a count of entries in the journal from a beginning entry to the first entry, a byte offset of the first entry from a beginning memory location of the journal, and a first time stamp reflecting a creation time of the first entry.

18. The non-transitory computer readable medium of claim 13, wherein the first entry comprises an identifier of the asset, and wherein the instructions further cause the computer to:
prior to causing the reference count associated with the asset part to be changed, check a status associated with the asset;
when the status indicates that the asset is eligible for change, cause the reference count associated with the asset part to be changed; and
when the status indicates that the asset is ineligible for change, not cause the reference count associated with the asset part to be changed.

* * * * *